_(12)_ United States Patent
Vagarappan Ulaganathan et al.

(10) Patent No.: US 12,387,347 B2
(45) Date of Patent: Aug. 12, 2025

(54) POSITION TRACKING WITH MULTIPLE SENSORS

(71) Applicant: Infineon Technologies AG, Neubiberg (DE)

(72) Inventors: Raghavendran Vagarappan Ulaganathan, Munich (DE); Ashutosh Baheti, Munich (DE); Reinhard-Wolfgang Jungmaier, Alkoven (AT); Avik Santra, Munich (DE); Saverio Trotta, Munich (DE); Prachi Vaishnav, Unterhaching (DE)

(73) Assignee: Infineon Technologies AG, Neubiberg (DE)

( * ) Notice: Subject to any disclaimer, the term of this patent is extended or adjusted under 35 U.S.C. 154(b) by 820 days.

(21) Appl. No.: 17/671,324

(22) Filed: Feb. 14, 2022

(65) Prior Publication Data

US 2022/0262016 A1 Aug. 18, 2022

(30) Foreign Application Priority Data

Feb. 18, 2021 (EP) ..................................... 21157944

(51) Int. Cl.
G06T 7/277 (2017.01)
G06T 7/292 (2017.01)
G06T 7/70 (2017.01)

(52) U.S. Cl.
CPC .............. *G06T 7/277* (2017.01); *G06T 7/292* (2017.01); *G06T 7/70* (2017.01); *G06T 2207/10044* (2013.01)

(58) Field of Classification Search
CPC ........... G06T 7/277; G06T 2207/10044; G06T 7/292; G06T 7/70
See application file for complete search history.

(56) References Cited

U.S. PATENT DOCUMENTS

2016/0103214 A1* 4/2016 Clark .................... G01S 13/723
342/59

* cited by examiner

*Primary Examiner* — Myron Wyche
(74) *Attorney, Agent, or Firm* — Slater Matsil, LLP

(57) ABSTRACT

In an embodiment, a method of tracking includes predicting a predicted state, in a global coordinate space, of an object based on a state of the object; determining in local coordinates the predicted state; determining a plurality of measurements of the object, in the local coordinates, with first and/or second radar sensors; determining a matching of the predicted state and the plurality of measurements, in the local coordinates, for a matching result; and updating the state of the object based on the matching result. The first and second sensors are arranged along perpendicular lines which intersect at the origin of the global coordinate space.

20 Claims, 9 Drawing Sheets

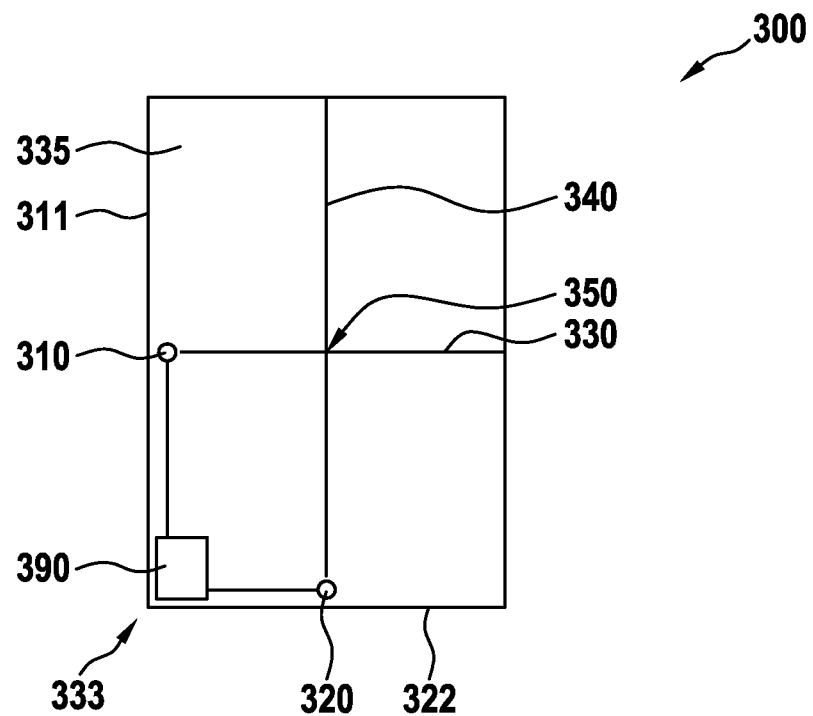
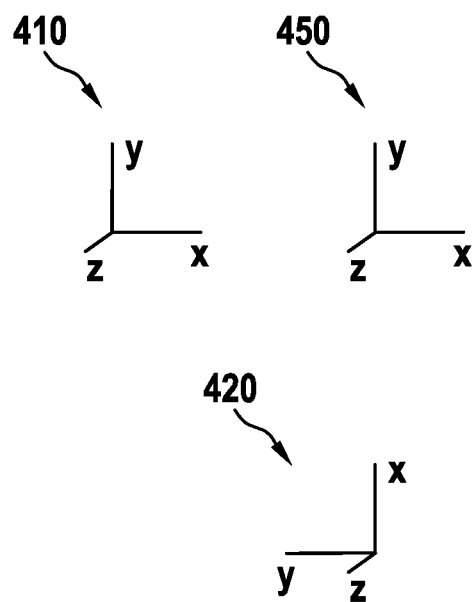

Fig. 9

$$P = \begin{bmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 0.2 & 0 & 0 \\ 0 & 0 & 0 & 0 & 0.2 & 0 \\ 0 & 0 & 0 & 0 & 0 & 0.2 \end{bmatrix}$$

$Q = \gamma * \text{diag}(q_c) * \gamma^T$

Where, $\gamma = \begin{bmatrix} 0 & 0 & 0 \\ 0 & 0 & 0 \\ 0 & 0 & 0 \\ 1 & 0 & 0 \\ 0 & 1 & 0 \\ 0 & 0 & 1 \end{bmatrix}$

Motion model:

$f = \begin{bmatrix} x + x' * dt \\ y + y' * dt \\ z + z' * dt \\ x' \\ y' \\ z' \end{bmatrix}$

---

Azimuth measurment model:

Rotate clockwise 90° + translation $[0\ 0.6\ 0]^T$ $R = \begin{bmatrix} 1 & 0 & 0 \\ 0 & 1 & 0 \\ 0 & 0 & 1 \end{bmatrix}$ + translation $[0\ 0.6\ 0]^T$ Inverse Rotation, $R^{-1} = \text{inv}(R)$ Convert from global to local:

$X\_\text{local} = \begin{bmatrix} R^{-1} & 0_3 \\ 0_3 & R^{-1} \end{bmatrix} * X$ Convert to measurement space:

$x = x_{\text{local}}$ (1)
$y = y_{\text{local}}$ (2)
$z = z_{\text{local}}$ (3)

[azi,ele,rr] = cart2sph (x, y, z)

---

Elevation measurment model:

Rotate clockwise 90° + translation $[0.4\ 0\ 0]^T$ $R = \begin{bmatrix} 0 & 1 & 0 \\ -1 & 0 & 0 \\ 0 & 0 & 1 \end{bmatrix}$ + $[0.4\ 0\ 0]^T$ Inverse Rotation, $R^{-1} = \text{inv}(R)$ Convert from global to local:

$X\_\text{local} = \begin{bmatrix} R^{-1} & 0_3 \\ 0_3 & R^{-1} \end{bmatrix} * X$ Convert to measurement space:

$p_x = x_{\text{local}}$ (1)
$p_y = y_{\text{local}}$ (2)
$p_z = z_{\text{local}}$ (3)

[azi,ele,rr] = cart2sph (x, y, z)

POSITION TRACKING WITH MULTIPLE SENSORS

CROSS-REFERENCE TO RELATED APPLICATIONS

This application claims the priority benefit of European Patent Application No. 21157944, filed on Feb. 18, 2021, which applications are hereby incorporated herein by reference.

TECHNICAL FIELD

Examples relate to methods and devices for tracking an object.

BACKGROUND

Tracking of objects is finding application across many fields for many purposes, such as for tracking a target, motion sensing, and gesture sensing.

SUMMARY

Herein are disclosed methods of tracking and devices for tracking that may improve tracking accuracy in challenging conditions such as when measurement signals are weak, dropped, or sometimes spurious.

A method of tracking an object is disclosed, including predicting a predicted state, in a global coordinate space, of an object based on a state of the object; determining in local coordinates the predicted state; determining a plurality of measurements of the object, in the local coordinates, with first and/or second radar sensors; determining a matching of the predicted state and the plurality of measurements, in the local coordinates, for a matching result; updating the state X of the object based on the matching result. The first and second sensors can be along perpendicular lines which intersect at the origin of the global coordinate space. Herein is disclosed a device including a processor that is configured to execute the method.

BRIEF DESCRIPTION OF THE DRAWINGS

Some examples of apparatuses and/or methods will be described in the following by way of example only, and with reference to the accompanying figures, in which:

FIG. 3 illustrates a device, according to an embodiment of the present disclosure;

FIG. 4A illustrates coordinate spaces, according to an embodiment of the present disclosure;

FIG. 4B illustrates a state, according to an embodiment of the present disclosure;

FIG. 9 illustrates mathematical operations and definitions, according to an embodiment of the present disclosure;

DETAILED DESCRIPTION OF ILLUSTRATIVE EMBODIMENTS

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

Figure 1:
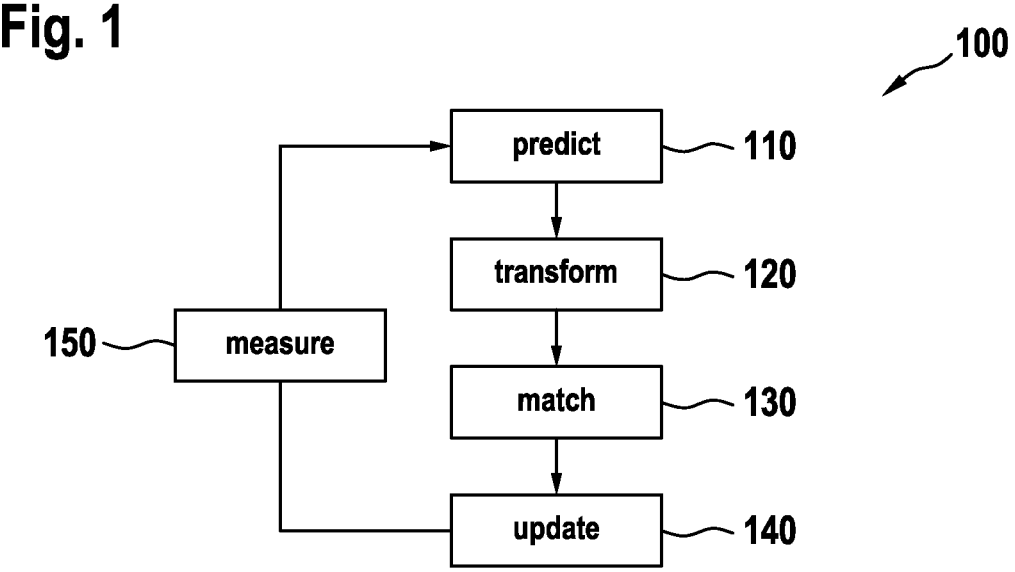
FIG. 1 illustrates a method of tracking an object, according to an embodiment of the present disclosure.

FIG. 1 illustrates a method 100 of tracking an object. The method 100 of tracking an object can include predicting no a predicted state (e.g., a subsequent state) in a global coordinate space of an object, based on a state of the object, such as a previous state, of the object. The method 100 can also include determining 120, in local coordinates (e.g., the coordinates used by the sensors), the predicted state (e.g., by transforming coordinates 120 from global coordinates used in predicting the state of the object into local coordinates). The method 100 can include determining 150 a plurality of measurements of the object in the local coordinates with a plurality of radar sensors, including first and second radar sensors. Having a plurality of sensors, particularly when optimized for placement, can aid in reducing blind spots and/or regions where the object is out of the field of view of the tracking device. Alternatively/additionally, multiple sensors may allow for continued data acquisition related to the object's state (e.g., position and/or velocity) when one of the sensors loses signal and/or produces spurious data.

Having exactly two sensors is particularly contemplated, such as two radar sensors. Two sensors may allow for redundancy and/or improved field of view coverage while keeping computational costs low. Redundancy, e.g., with multiple sensors, can aid in enabling tracking to continue when the object drops out of the field of view of one of the sensors. For example, the second sensor can be able to continue acquiring data for the determination of measurements of the object while the object is out of the field of view of the first sensor.

A computer processor, for example, can be used to predict no the state of the object, such as the object's position and velocity. The prediction may be based on an unscented Kalman filter. The prediction can be done using global coordinates, which may aid in utilizing the parameterized state of the object for other applications and/or reduce computational costs, particularly when using multiple sensors for determining measurements of the object.

The transform of variables can be performed 120, such as to aid in comparison of the parameters used in the prediction no with measurements determinable from sensors. The predicted state of the object can be compared with measurements to determine matches and/or associations between the predicted state and the measurements 130. The state of the object can be updated 140 based on the matching. The sensors can be configured to collect data from and/or determine 150 measurements from an object, from a scene that includes an object, and/or from an identifiable tag of an object.

The method 100 can also include determining 130 a matching of the predicted state and the plurality of measurements from the sensors, in the local coordinates, for a matching result. The matching result can be a global cost, such as a global scalar value, which can determine an association between measurements and the predicted state, tracks of states, and/or active tracks. A global cost and/or global cost function may estimate a degree of association between measurements and the predicted state. Alternatively/additionally, the matching result, such as a global cost, can estimate a degree of association between measurements and a track of the object, e.g., a sequence of states of the objects which may have been determined before the measurements (e.g., current measurements) were made.

The method 100 can include updating 140 the state of the object based on the matching result, e.g., the global cost and/or global cost function. The matching determination 130 and/or matching result can be based on a Hungarian bipartite matching algorithm.

A Hungarian bipartite matching algorithm can determine assignments, associations, correlations, and/or similarities between the determined measurements 150 and the existing track(s) and/or predicted state(s). Existing track(s) may include a predicted state.

The matching result can be based on a global cost and/or GCF, e.g., a maximum or minimum GCF. The global cost can be determined by the Hungarian bipartite matching algorithm, e.g., such that 1:1 matching between measurement(s) and existing track(s) and/or predicted state(s) are determined. Alternatively/additionally, Hungarian bipartite matching can determine matching of the measurements and tracks which include at least one state of the object which has been determined at a time preceding the measurements.

Figure 2:
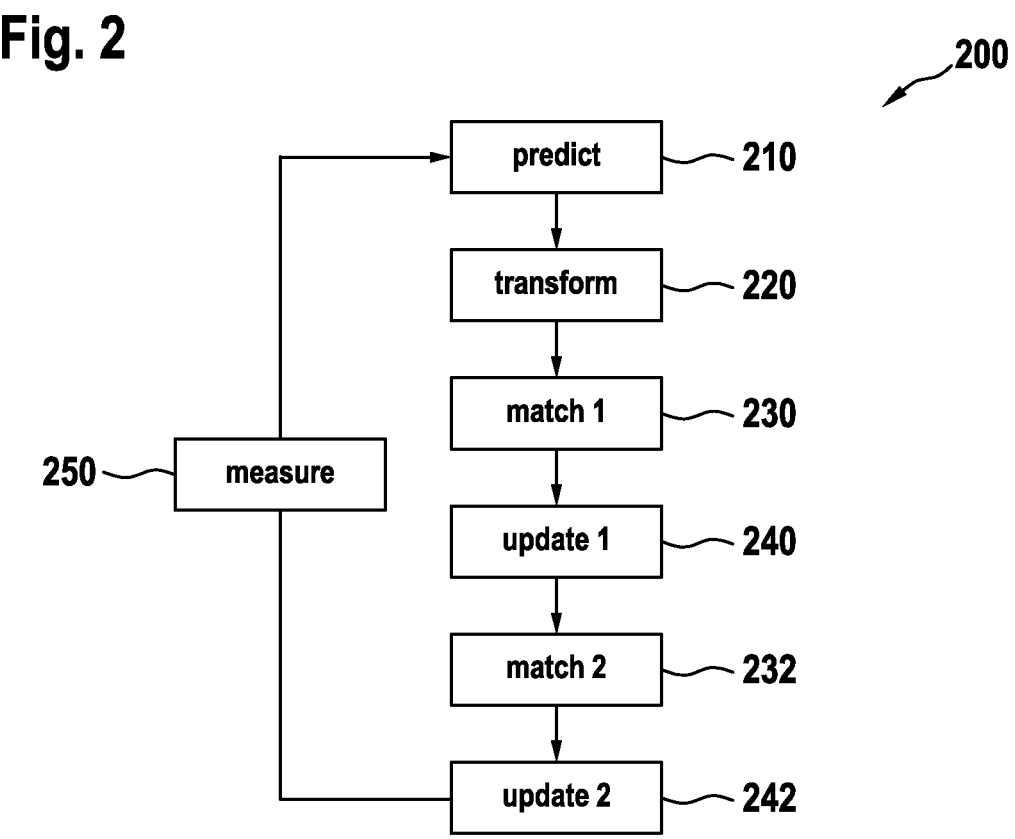
FIG. 2 illustrates a method of tracking, according to an embodiment of the present disclosure.

FIG. 2 illustrates a method of tracking 200. The method 200 illustrated in FIG. 2 can be comparable to that shown in FIG. 1. FIG. 2 shows that the method 200 can include predicting 210 a state of an object, transforming 220 the state of the object (e.g., from global variables to local variables of the sensors), matching 230, 232 and updating 230, 240. The method 200 can include determining 250 measurements from a plurality of sensors, such as a first measurement(s) from a first sensor and a second measurement(s) from a second sensor. Each sensor can determine 250 zero or a plurality of measurements before the matching 130, 230, 232. The method 200 shown in FIG. 2 may be particularly advantageous when there are multiple sensors that each have independent noise. With the method illustrated in FIG. 2, unsynchronized sensors may aid in accurate tracking, e.g., with measurements that are collected sequentially from sensors.

In an example, at least one sensor is used to determine 250 a plurality of measurements before the matching steps 230, 232. It is possible that only one of the sensors provide data to determine 150, 250 of any measurements 250 before the matching steps 230, 232. Each sensor may be capable of being used to determine multiple measurements, for example. The measurements determinable 150, 250 from each sensor 310, 320 may be at least one of: a range (e.g., a distance), an azimuthal angle, an elevation angle, a polar angle, and a radial velocity. Angular velocities may alternatively/additionally be determinable.

For example, in an asynchronous method, the determination of a measurement 150, 250 with any of the sensors 310, 320 (such as at least one of the sensors) can trigger a cycle of the method 100, 200 as explained herein with reference to FIG. 1 and/or FIG. 2. The determination of a measurement 150, 250, such as a measurement based on a radar pulse reflection received by sensor 310, 320, can provide data for updating 140, 240, 242 the state of the object (e.g., the object position and/or velocity). The measurement 150, 250 can trigger at least a matching 130, 230, 232, for example, and can also trigger at least indirectly at least one of the prediction(s) 110, 210 transform(s) 120, 220, and updating 140, 240.

For example, determination 150, 250 of the plurality of measurements can trigger the matching 130, 230, 232, which is followed by the updating 140, 240 (possibly before a further predicting and/or subsequent measurement of a subsequent cycle of the method).

As illustrated in each of FIGS. 1 and 2, the matching 130, 230, 232 and updating 140, 240, 242 can be performed sequentially (such as in the order shown in FIGS. 1 and/or 2). Referring to FIG. 2, for example, a first matching 230 of the predicted state and the first measurement(s) is determined, and a second matching 232 of the predicted state and the second measurement(s) is determined. The updating can include a first update 240 and a second update 242. The first update 240 can occur between the first matching 230 and the second matching 232. The second update 242 can be determined after the second matching (232). Such a sequence can allow asynchronous tracking; alternatively/additionally, such a sequence can aid in accurately updating the object position when the measurements from one of the sensors is spurious or missing.

For example, it is possible that a match between the measurement and the state can be excluded (e.g., when the measurement(s) is an outlier and/or the measurement(s) is undetermined). Taking an illustrative example in which there are exactly two sensors, with reference to FIG. 2: a measurement is determined 250 by the second sensor 320; the first matching 230 has no first measurement with which to determine a match; the first updating 240 can set the state of the object to be equal to the predicted state (which may be unchanged from the last updated state); the method continues, as shown in FIG. 2, by determining 232 a second match between the measurement from the second sensor 320 and the predicted state as determined 210; the second update 242 can then occur, based on the match result determined 232 from the second sensor 320 and the predicted state. In such a case, the first updating 240 can set the state of the object to be to the predicted state and/or the previous state (e.g., the state as previously updated in the immediately preceding cycle of the method 200).

As suggested, FIGS. 1 and 2 may each illustrate a single cycle of respective methods 100, 200 of tracking in which multiple cycles of the method are performed. For example, with each successive determination of measurements 150, 250 of at least one sensor, the state of the object is updated based on the prediction 110, 210, transformation 120, 220, and match(es) 130, 230, 232. For example, after a duration in which measurements 150, 250 are determined from at least one sensor (possibly from multiple sensors), the state of the object is updated based on the prediction 110, 210, transformation 120, 220, and match(es) 130, 230, 232. After updating 140, 240, 242, subsequent measurements can be determined 150, 250, and the cycle can begin anew, using the last updated state as the state to be updated in the subsequent cycle.

It is possible that the method is based on a clock, and/or repeating regularly with time. Each cycle of the method 100, 200 can be repeated at regular intervals. For example, the sensors can collect data for a duration, after which the predicting 110, 220 transforming 120, 220 matching 130, 230, 232 and updating 140, 240 242 is done. The duration can be constant or be varied. The duration may be varied, e.g., by a processor 390 of the device 300, in such a way that depends on the state of the object, such as a velocity thereof (e.g., a linear velocity and/or an angular velocity). For example, when there is N sensors, over a duration, M sensors (M≤N) may acquire data from which measurements are determined 250; in such a scenario, there may be M matching determinations 230, 232 and M updates 240, 242.

It is possible that the methods 100, 200 described herein can be used with a plurality of N sensors. The measurement(s) can be determined 150, 250 from at least one of the N sensors. The determination 130 of matching can be done with the entire plurality of measurements, or any part thereof. As illustrated in FIG. 1, a single update can be determined 130 after the matching. As illustrated in FIG. 2, for N=2, there can be a sequence of matching determinations 230, 232 and updates 240, 242 such that after matches are determined for the $N^{th}$ sensor, an $N^{th}$ update is determined. It is also possible that, with each data acquisition, measurement determination, and/or transmission of data to the processor from one of the N sensors, the matching process is triggered. As in FIG. 1, there can be one update 140 which is based on the measurement(s) from one of the N sensors.

After each update, the method of tracking 100, 200 may continue in cyclic form (see FIGS. 1 and 2), such as when new measurement(s) are determined, or after a duration of time in which measurements are acquired or determined; and/or using measurement(s) that were determined since the previous measurement(s). Each cycle of the method 100, 200 may contribute to the determination of a track (e.g., a sequence of states) of at least one object. It is also possible that the methods 100, 200 determine more than one track, e.g., when multiple objects are tracked and each object has one track, and when features of an object are tracked and each feature has one track.

FIG. 3 illustrates a device 300, such as a personal electronic device and/or component thereof, such as a printed circuit board assembly (PCB assembly). The device 300 is configured to track an object according to the methods 100, 200 described herein. The device 300 includes a processor 390 which can be communicatively coupled to a plurality of sensors 310, 320, such as radar sensors. It is particularly contemplated to have exactly two sensors. The plurality of sensors includes a first sensor 310 and a second sensor 320. The first and second sensors 310, 320 can be arranged along perpendicular lines 330, 340 (imaginary lines) that intersect at an origin 350. The origin 350 can be used as the origin of a global coordinate space, for example in the predicting 110, 120 of a predicted state of the object based on its current and/or previous state.

FIG. 4A illustrates coordinate spaces. The global coordinate space 450 (GCS 450) can have an origin 350 and orientation such that the x-y plane of the GCS corresponds to a plane of reference, such as the plane 335 of the device 300, such as a PCB assembly, or personal electronic device, such as a tablet and/or smartphone. For example, the device 300 of FIG. 3 has the sensors 310, 320 at a reference plane 335 that includes the perpendicular lines 330, 340. The first device 310 can be at a point of the first line 330. The second sensor 320 can be at a point of the second line 340. The intersection of the perpendicular lines 330, 340 may correspond to the origin 350 of the global coordinate system 450; and the lines 330, 340 may define the reference plane, e.g., the reference plane 335 of the device. The lines 330, 340 can be correspond to x and y axes, respectively, of the GCS.

The first sensor 310, as illustrated in FIG. 3, may be at a first edge 311 of the device 300. The second sensor 320, as illustrated in FIG. 3, may be at a second edge 322 of the device 300. The first and second edges 311, 322 may meet at a corner 333 of the device.

The sensors 310, 320 may have a field of view that projects away from device, such as along a z axis which extends away from the intersection of the perpendicular lines 330, 340, which may be regarded as directions x 330 and y 340, respectively.

The sensors 310, 320 may be oriented, such as to complement each sensor's field of view to optimize, e.g., maximize, the field of view of the device 300. The sensors can use a local coordinate system, e.g., each sensor uses a local coordinate system. The sensors can measure, for example, an azimuth and elevation, each in a respective local coordinate system. The sensors 310, 320 can be placed such that the global coordinate space 450 is centered (e.g., has the origin 350) at the center of the reference plane (which may correspond to the plane 335 of the device). Perpendicular lines 330 and 340 may correspond, respectively to the x and y axes of the global coordinate space 450.

Having the sensors arranged so that the origin 350 is centered may aid in tracking the object, such as by providing a field of view that is defined relative to the device. Other applications of the device may utilize the state of the object as determined by the tracking method 100, 200. It can be useful to have the state of the object expressed in a coordinate space, such as the GCS 450, that is intuitively aligned and/or oriented with the device. Alternatively/additionally, the positions of the sensors 310, 320 along the perpendicular axes 330, 340 can work synergistically with the placement of the origin 350 in the center to simplify coordinate transformation(s) that can be done in order to efficiently match measurements based on sensor data with predicted states.

It is optional to synchronize the sensors. An advantage of the methods 100, 200 described herein is that tracking errors (such as loss of tracking) are reduced in challenging circumstances, such as when there is timing jitter, such as timing mismatch between sensors, system jitter, jitter within individual sensors, and/or unsynchronized measurements. Corrupted phase and/or measurements, such as when the object falls in the blind-spot of a particular sensor may also be challenging (measurement drops).

There may be a set of x, y, z (and/or r, θ, φ) local coordinates for each sensor. As illustrated in FIG. 4A, a first local space 410 can originate at the first sensor 310, and the second local space 420 can originate at the second sensor 320. The orientations of the local coordinates, 410, 420, and 450 may be different. For example, the second local space 420 can be rotated at an angle, such as 90°, from the global coordinate space 450, e.g., about a z-axis which extends away from the x-y plane (the x-y plane can includes radar receivers 310, 320 and the origin 350 of the global coordinate space 450). The orientation of the second sensor 320 can be rotated at the angle along z-axis from alignment with the global coordinate space 450. At least one of the sensors 310, 320 can be in at least partial alignment with the global coordinate space 450.

As in FIG. 4A, the orientation of the first local space 410 and global coordinate space 450 may be aligned (e.g., each of the axes of the two spaces are parallel, e.g., x axis of 410 is along that of 450, y axis of 410 is along that of 450, and z axis of 410 is along that of 450). For example, a transformation from the global coordinate space 450 to the first local space 410 (e.g., a determination 120 in the first local space 410, of a predicted a state which is predicted 110 already in the global coordinate space 450) can be done by a translation of the x component of the predicted state. As seen in FIG. 4, the first local space 410 and the global coordinate space 450 can be identical except for an offset along the x direction.

It is noted that the sensors may have orientation. For example, sensor output can include azimuthal data, which may be expressed relative to an orientation of the sensor. A transformation 120, 220 from GCS 450 to a local coordinate space (e.g., second local space 420) may include a translation and a rotation.

As seen for example in FIG. 4A for the second local space 420, a local space 420 may be rotated with respect to the global coordinate space 450. For example, a determination 120, 220, in the second local coordinates 420, of a state of an object—the state being initially expressed (e.g., as a vector) in the global coordinate space 450—may be done by a translation and a rotation. For example, for determining 120, 220 in the second local space 420, a state that was predicted 110, 210 in the global coordinate space 450: they component of the state in the global space 450 can be translated (e.g., in y by the distance between the GCS origin 350 and the second sensor 320); and the state can be rotated (e.g., about the z axis by 90° counterclockwise).

For example, the state can be a vector and the transform 120, 220 of the state from the global coordinate space 450 to the local space(s) 410, 420 can be done by a matrix and/or matrices, e.g., by matrix manipulations.

The sensor(s) 310, 320 can have orientations. For example, the sensors each use respective local coordinate spaces 410, 420 that are oriented. The sensors 310, 320 may be radar sensors, for example, and/or may have an orientation for determining azimuthal angle and/or a reference direction (e.g., an x, y, and/or z direction, and/or a direction corresponding to an azimuthal angle of 0° and/or an elevation angle of 0°). For example, the sensors 310, 320 can be oriented in the device 300. For example, the sensors are in the XY plane. Alternatively/additionally, the first sensor 310 is aligned so that its 0° azimuthal angle is oriented at a known angle relative to the 0° azimuthal angle of the second sensor 320. The known angle may be 90°, e.g., such that the first sensor 310 is aligned along the x direction 330 and the second sensor 320 is aligned along the y direction 340. It is practical that the device 300 can be rectangular as this can be a preferred shape for consumer devices and can provide an intuitive interface.

The effectiveness and/or efficiency of the sensor may be direction dependent. The effectiveness and/or efficiency may be related to the accuracy of radar measurements and/or an increased field of view, for example. The sensor may be most sensitive to detecting objects and/or small changes in the position of objects within a part of the sensor's entire field of view. For example, the sensor has a maximum sensitivity and/or effectiveness at 0° azimuthal angle, and the azimuthal angle is defined with respect to the orientation of the sensor itself. The sensor's orientation can be adjusted on the device to maximize the sensor sensitivity and/or the effectiveness and/or sensitivity of the device 300. It is contemplated to have the sensors 310, 320 oriented to maximize effectiveness and/or efficiency in the region of space directly in front of the device, e.g., toward the center of the device, while allowing for the field of view to extend off-center of the device in all directions, at least in the region of space in front of the reference plane 335 of the device.

It can be advantageous to have the first sensor 310 at an edge 311 of the device 300 which is perpendicular to the x axis 330, and oriented for maximum efficiency along the x axis 330 facing the GCS origin 350, and the second sensor 320 on another edge 322 of the device 300 which is perpendicular to the y axis 330, and oriented for maximum efficiency along the y axis 340 facing the GCS origin 350, such that the edges 311, 322 meet at a corner 333 of the device 300.

Alternatively/additionally, a sensor(s) can be calibrated so as to determine the orientation of the sensor(s). For example, after the sensor(s) is attached to the device, PCB board, or the like, a calibration can be formed to define the azimuthal angle of 0°. As illustrated by comparison of FIGS. 3 and 4, it is particularly contemplated that the first and second sensors 310, 320 can be centered at respective adjacent edges 311, 322 of a rectangular device 300, and oriented so that the local coordinates are rotated at 90° about the z axis from each other.

It can be convenient to use the global coordinate space 450 to predict 110, 210 the state of the object being tracked, and to transform 110, 120 the predicted state into local coordinates 410, 450 before matching 130, 230, 232. The global coordinate space 450 can be used for the predicting and storing of the determined state of the object. The state of the object, in the global coordinate space 450, can be accessed by other processes and/or utilized for other device functionalities (e.g., for tracing object motion for determining input signals, and/or providing warnings when the tracked object may reach a limit of the field of view of the device). The state of the object, in the global coordinate space 450, can be used for other purposes for which the global coordinate space 450 is convenient. Use of the global coordinate space 450 to describe a tracked object's state is particularly convenient when the origin of the space 450 is near the center of the device.

FIG. 4B illustrates a state X. A state X may be a vector such as a vector that includes at least one position element (x, y, z) and/or at least one velocity component element (x', y', z'). Polar coordinates (r, θ, φ) and/or Cartesian coordinates (x, y, z) may be used, for example. The state X may include radial velocity, e.g., in θ and/or φ. The state X may be in any space, such as a local space 410, 420 or the global coordinate space 450, for example. Transformations, such as by linear methods, may be used to change coordinates, e.g., to change the representation of the state from one space to another and/or from one coordinate system to another.

For example, in the methods of tracking 100, 200 described herein, determining 120, 220, in local coordinates 410, 420, the predicted state can include: coordinate-transforming the predicted state of the object into a first local space 410 of the first sensor 310, and coordinate-transforming the predicted state of the object into a second local space 420 of the second sensor 320. For example, some of the steps of the method 100, 200 of tracking may utilize comparisons (e.g., determination 130, 230 of matching) between the measurements as determined from the sensors 310, 320 and the predicted state X. The measurements may each be determined in the local spaces 410, 420 of the respective sensors 310, 320. Transforming coordinates from global space can enable matching and updating the state vectors of the object.

As can be represented in FIG. 1, for example, the method 100 of tracking can determine 130 the matching after the coordinate transformation 120. The coordinate-transforms can be done after the determining 120 in global coordinates 450 the predicted state X. For example, each of the coordinate-transforming of the predicted state of the object into the first local space 410, and the coordinate-transforming of the predicted state into the second local space 420 can be done after predicting no the predicted state in the global coordinate space 450 and before determining 130 the matching.

It is also possible that the predicting 110, 210 of a predicted state of an object based on a (previous) state of the object and the determining 120, in local coordinates 410, 420 the predicted state can be combined. The predicted state may be determined in the same coordinate space and/or system as the (previous) state such as in global coordinate system/space. For example, appropriately modified matrix forms of the prediction operations can be used. For example, predicted states can be computed based on a motion model of the tracker. Also, an observation and/or measurement model of a Kalman filter (e.g., in matrix form H) can include a coordinate transformation. A predicted state can be determined in an arbitrary coordinate system, such as a global coordinate space.

Figure 5:
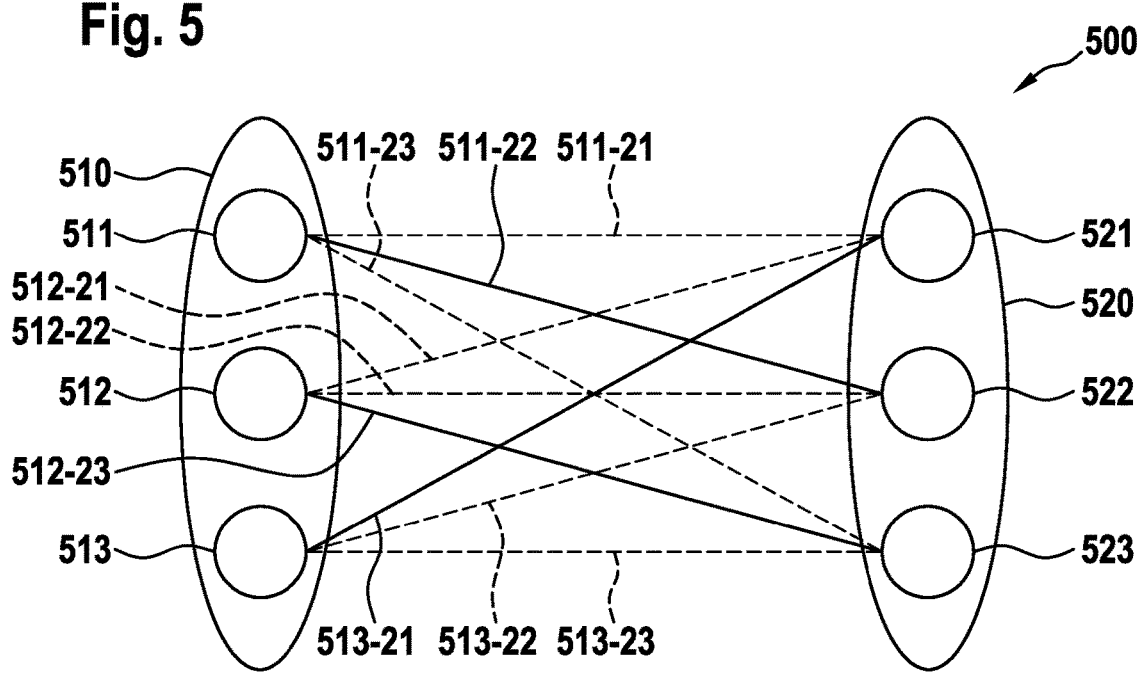
FIG. 5 illustrates a block diagram of matching, according to an embodiment of the present disclosure.

FIG. 5 illustrates a block diagram of matching 500. The matching 500 described with reference to FIG. 5 can be utilized in the methods 100, 200 of tracking an object described herein, such as in a process of matching 130, 230, 232 a predicted state and a plurality of measurements. The matching 500 of FIG. 5 can be Hungarian bipartite matching. Hungarian bipartite matching can include an algorithm for optimal matching of nodes, such as a first group of nodes 511, 512, 513 and a second group of nodes 521, 522, 523.

FIG. 5 can illustrate an example with multiple tracks 511, 512, 513 which may be regarded as the first group of nodes 511, 512, 513. The measurements 521, 522, 523 can be regarded as a second group of nodes 521, 522, 523. The matching 500 can determine the association and/or correspondence of tracks 511, 512, 513 with measurements 521, 522, 523. Global matching, which may help in association between active tracks and current measurements, may be represented in FIG. 5.

It is also possible to implement the tracking method, particularly the matching 500 thereof, to a single track. An object may have more than one tracked feature. For example, multiple features of an object can be identified and tracked. FIG. 5 illustrates a case with multiple tracks, which may be representative of tracking multiple objects. Alternatively/additionally, tracks 511, 512, 513 may correspond to a plurality of features of an object for which the respective features are tracked.

The first group of nodes 511, 512, 513 (e.g., states, tracks, and/or components of a state) may be in a first frame 510 (e.g., of a given time). The nodes 511, 512, 513 can correspond to a predicted state(s) and/or tracks of a tracked object(s) for which a state is predicted 110, 210 and/or previously known. FIG. 5 shows nodes 521, 522, 523 of a second frame 520 (e.g., a subsequent frame to the first frame 510). The nodes 521, 522, 523 of the second frame 520 can correspond to measurements, such as measurements as determined from the sensor(s) 310, 320. The determination 130, 230, 232 of matching, in the methods 100, 200 described herein, may determine the matching of nodes 521, 522, 523 of the second frame 520 to nodes and/or tracks 511, 512, 513 of the first frame 510. For example, the determination 130, 230, 232 may assess the association and/or correspondence of measurements (e.g., in the form of nodes 521, 522, 523) to the nodes 511, 512, 513 (e.g., states, tracks, and/or components of a state).

The determination 130, 230, 232 of the matching 500, such as is illustrated in FIG. 5, may match the predicted state of the object and the plurality of measurements, in the local coordinates 410, 420. Alternatively/additionally, the determination 130, 230, 232 of the matching 500 may determine a matching result, such as a global cost minimum and/or global cost function GCF. GCF can solve for an association problem between the plurality of measurements and the existing active tracks (e.g., multiple targets tracked in a given frame). A GCF can determine a global cost and/or global cost minimum, for example.

The matching result may include information about a similarity measure (e.g., increased certainty) between the measurements and current active state vectors, for example/ based on a global minimum Mahalanobis distance between the nodes in 510 and 520.

FIG. 5 shows intermediate results 511-21, 511-22, 511-23, which are represented as lines connecting the first node 511 of the first frame 510 to the first, second, and third nodes 521, 522, 523 of the second frame 520. The intermediate results 511-21, 511-22, 511-23 are depicted as solid or dotted lines.

FIG. 5 also shows intermediate results that connect the second node 512 of the first frame 510 to the first, second and third nodes (512-21, 512-22, 512-23) of the second frame 520; and the third track 513 of the first frame 510 to the first, second and third nodes (513-21, 513-22, 513-23) of the second frame 520.

Each of the intermediate results 511-21, 511-22, 511-23, 512-21, 512-22, 512-23, 513-21, 513-22, 513-23 can each be determined based on assessing the association, similarity and/or correlation between each node 511, 512, 513 of the first frame 510 and each node 521, 522, 523 of the second frame 520.

In FIG. 5, the determined and/or optimal matching is illustrated by the solid lines 511-22, 512-23, 513-21. The solid lines solid lines 511-22, 512-23, 513-21 may indicate intermediate results which are indicative of greater certainty of these matches being accurate. The remaining dotted lines can be indicative of relatively poorer certainty of matches in comparison to those of solid lines 511-22, 512-23, 513-21. The matching result, global cost, and/or GCF, may be determined such that it is shown, for the example of FIG. 5 that, when all possible matches are taken into account, it is more likely that track 511 matches node 522 than any other node; similarly, it is more likely that track 512 matches node 523; and it is more likely that track 513 matches node 521.

The matching result can be determined by the assessment of the association of each node 521, 522, 523 of the first frame 510 with each node 521, 522, 523 of the second frame 520.

In FIG. 5, the determined matches between each node 511, 512, 513 and each node 521, 522, 523 are depicted as solid lines 511-22, 512-23, 513-21. As illustrated in FIG. 5, dotted lines indicate a lower assessment of association, correlation, and/or similarity. The example of FIG. 5 can represent a matching 500 which determines a 1:1 match between each of nodes 521, 522, 523 and respective nodes 511, 512, 513. In the example of FIG. 5, a relatively high score for the intermediate results 511-22, 512-23, and 513-21 and relatively low score for the remaining intermediate results can lead to a matching result which determines the matching of nodes 521, 522, 523 and respective nodes 511, 512, 513.

The method 100, 200 of tracking may include updating 140, 240, 242 a state X of an object based on the matching result. The matching result may, for example, be compared to a threshold and/or acceptable range, to determine how the state of the object is updated 140, 240, 242. For example, if the matching result is high (e.g., there is relatively high association between the measurement(s) and the predicted state, such as an acceptable range of association), the update 140, 240, 242 may be to accept an update to the state directly from the measurement. If the matching result is relatively poor (e.g., there is relatively low association between the measurement(s) and the predicted state, such as out of an acceptable range of association), the update 140, 240, 242 may be to use the predicted state for the update (e.g., to discard the measurement and to determine the state based solely on the prediction).

As mentioned herein, a plurality of measurements can be determined by a plurality of sensors, such as first and second sensors 310, 320. The determination of the matching 130, 230, 232, such as in a manner illustrated the block diagram of matching 500 of FIG. 5, may utilize a group of first measurements from the first sensor 310 and/or a group of second measurements from the second sensor 320.

For example, the method 100 of tracking can be an asynchronous method. The determination 150 of any measurement from any sensor 310, 320 can trigger an update 140. For example, a transmission of sensor data 310, 320 to the processor 390 can initiate a cycle of the method 100 of tracking 100, including when the transmission comes from only one sensor. The method of tracking 100 can include repeating the algorithm with each data transmission from any of the sensors 310, 320. For example, the state X is updated with each determination of a measurement iso. The updates 140 can happen as sensor data is available and/or transmitted (e.g., to the processor 390 of the device 300). An update 140 can occur when a measurement(s) based on at least one of the sensors 310, 320 is determined.

Updating 140 can include changing the state X based on the method 100 as described herein, and can alternatively include leaving the state unchanged, e.g., when spurious data is determined. For example, the object may be static, and the predicted state may be identical to the initial state (e.g., no change in state is predicted); a spurious detection event may trigger a measurement, and the tracking method as illustrated in FIG. 1 is performed; and the updating 140 may set the state X of the object to be identical to the predicted state and/or previous state.

In another example, the matching determination 130, 230, 232 can include: determining 230 a first matching result of the predicted state and a plurality of first measurements of the first sensor 310; and determining 232 a second matching result of the predicted state and a plurality of second measurements of the second sensor 320. For example, each update occurs at a regular interval, and the sensor data that is generated over each successive interval is used to track the object.

With reference to FIG. 2, the determination of matching can include a first matching 230 of the predicted state and the first plurality of first measurements of the first sensor, and a second matching 232 of the predicted state and a second plurality of second measurements of the second sensor 320. The updating can include a first update 240 to the state X which is done between the first matching 230 and the second matching 232. A second update 242 can be done following the second matching 232, such as immediately following the second matching 232.

Figure 6:
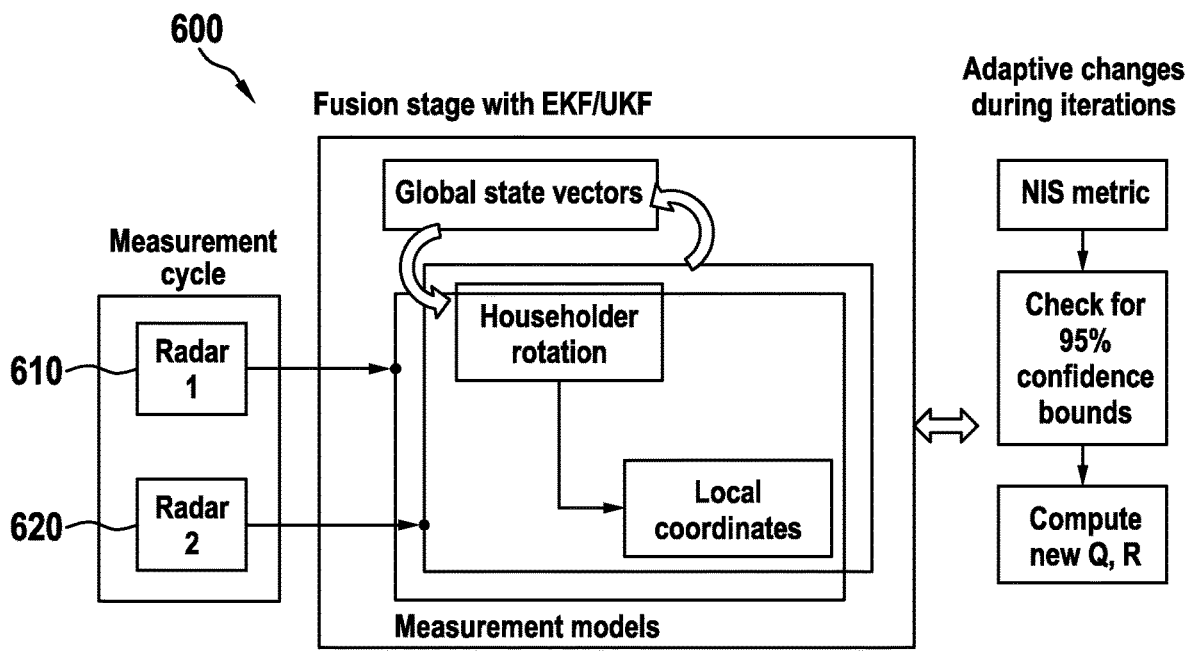
FIG. 6 illustrates a block diagram of a method of tracking, according to an embodiment of the present disclosure.

FIG. 6 illustrates a block diagram of a method 600 of tracking. The device for implementation of the method can have more than one radar sensor, such as exactly two radar sensors 610, 620. Multiple radar sensors can aid in reducing the loss of signal; for example, when one sensor loses signal, the other(s) can continue providing data for tracking the object. Two radar sensors 610 can reduce the computational load in comparison to more, and/or can significantly cover the desired field of view. Two or more monostatic radar sensors, such as millimeter-wave (mmWave) radar sensors, are particularly contemplated, which can be useful in short-range applications.

As illustrated in FIG. 6, the tracking method 600 can includes a measurement cycle (e.g., for determining measurements), a fusion stage (e.g., for predicting 110, 210 the object state and/or coordinate transformations 120, 220), and adaptive changes (e.g., for matching 130, updating the object state 140, statistical determinations, and/or adjustment of algorithmic parameters). The measurement cycle (which can correspond to the determination of measurements 150, 250) can pass and/or communicate sensor data from the sensor(s) to the processor. Alternatively/additionally, the sensor measurements may be taken sequentially and fused with the unscented Kalman filter. The processor can determine the state, e.g., the state vector(s) in global coordinate space (e.g., determination of global state vectors).

In the fusion stage depicted in FIG. 6, determinations of coordinate transformations can be done, such as rotation and/or translation of the state vector, and prediction(s) of state(s). The prediction of the state of the object may utilize an extended Kalman filter and/or an unscented Kalman filter, for example. Adaptive changes can update the state of the object as well as the models/parameters of the Kalman filter. With each adaptive change (or determination of no change of state), a normalized innovation squared (NIS) metric can be determined. The NIS metric can be used to determine how the update occurs. A NIS metric can be calculated to check for lower and/or upper bounds, such as based on confidence levels, e.g., required confidence levels, to modify process noise, Q and measurement noise, R accordingly that can be used in prediction and/or measurement steps of the tracker. A NIS metric can be used for smooth updating of tracker parameters.

The algorithm can be tweaked, particularly the parameters utilized in the fusion stage, such as the process noise Q, and measurements noise R. The process noise Q and measurements noise R parameters can be computed at the end of a cycle, based on the NIS metric and a confidence bound (e.g., a 95% confidence bound). The updated state X, process noise Q, and measurements noise R parameters can be used in the next cycle. Alternatively/additionally, Q and R can be calibrated before the device 300 is used. Q and R can be tweaked, for example, to bring the NIS and/or measurements within confidence bounds.

The methods and devices described herein may operate using assumptions and/or features such as at least one of: measurement noise for each sensor is independent of measurement noise of other sensors; the estimation of states of each target from each sensor corresponds to the true target state with negligible error; measurements, including unsynchronized measurements that are sequentially processed.

Figure 7:
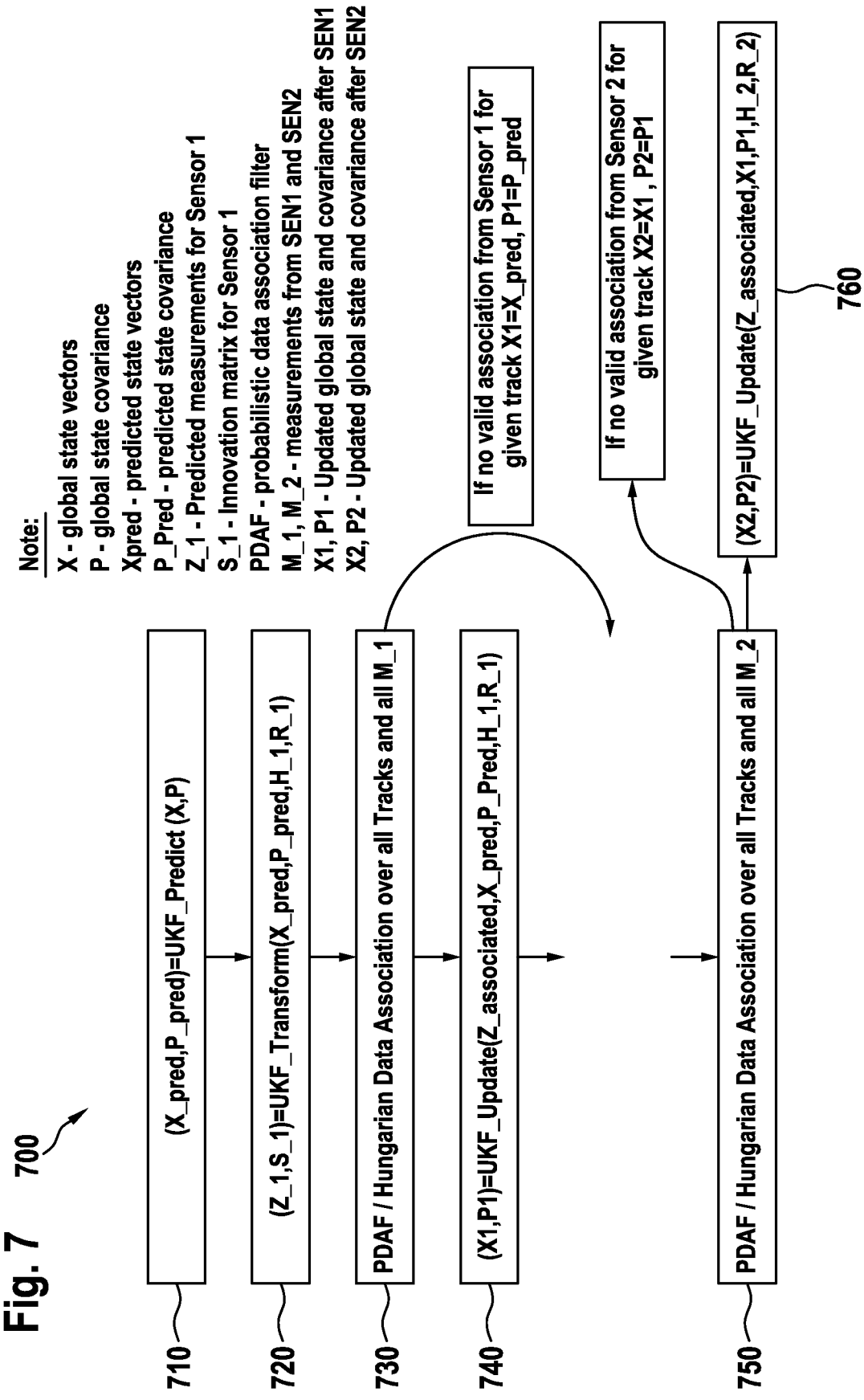
FIG. 7 illustrates a cycle of a method of tracking an object, according to an embodiment of the present disclosure.

FIG. 7 illustrates a cycle of a method 700 of tracking an object. The method can include a determination 710 of the predicted state X_pred and covariance P_pred using an unscented Kalman filter (UKF). After the prediction 710, there can be a transformation 720 of the predicted state X_pred from the global coordinate system to the local coordinates for a first sensor. Predicted measurements Z_1 for the first sensor and a corresponding innovation matrix S_1 can be determined 720.

It is possible that the prediction 710 and coordinate transformation 720 are combined in a single determination. For example, when an unscented Kalman filter is used to determine 710 the prediction, a motion model can be used. The observation model H can be combined with the coordinate transformation during the measurement step, so that the actual measurements and predicted measurements are compared before the state update.

After predicted measurements Z_1 are determined, determining 730 a matching with a probabilistic data association filter can be performed, or using a Hungarian bipartite filter. The matching determination 730 can be applied to determine matching of the tracks, e.g., the predicted measurements Z_1, and the measurements of the first sensor. Next, there can be a first update 740, which can determine the state X1 and the state covariance P1, e.g., by updating the state and covariance.

The update can be based on selecting the predicted state X_Pred as the updated state X1 (e.g., a first determined updated state, such as based on the first measurements form the first sensor 320), such as when the association of the first sensor measurement and the predicted state is relatively poor (e.g., out of an acceptable range for the first update determination). In another scenario, the update can be the associated measurement from the first sensor Z_associated, such as when the association of the first sensor measurement and the predicted state is in high agreement. In another scenario, the updated state X1 can be a state based on combining the predicted state X_Pred and the first sensor measurements. The combination, e.g., the relative weights of the predicted state X_Pred and first sensor measurements that go into the updated state X1 may be determined based on the unscented Kalman filter, such as the observation model H_1 and/or the covariance R_1, particularly that of the measurement noise.

The process (e.g., as described directly above for FIG. 7 and the first sensor measurements) can be modified for the second sensor measurements. The process can use the updated state determined from the first sensor as the initial state X, transforming coordinates if appropriate, determining matching 750, and updating 760 the state of the object. As illustrated in FIG. 7, the prediction 710 can be done once per cycle, for example, e.g., whether there is data from no sensor, one sensor, or multiple sensors.

Referring again to FIG. 7, it is possible to determine that there is not a valid association from the second sensor (e.g., based on a matching result which is out of an acceptable range. In such a case, the updated state X2 (e.g., determined from a second update to the state) can be set to the previously updated state X1. Alternatively, as with the description above directed at determinations related to the first sensor's measurement, the state of the object can be updated according to a match, e.g., a match determined to be within an acceptable range (such as based on a second match result). There may be an acceptable match between (i) the predicted state X_Pred and/or the previously updated state X1 and (ii) the measurements from the second sensor. The updated state X2 can be a state based on combining (i) the previously updated state X1 and/or predicted state X_Pred and (ii) the measurements from the second sensor. The combination, e.g., the relative weights of the second sensor measurements and the predicted state X_Pred (and/or first updated state X1) that go into the updated state X2 may be determined based on the unscented Kalman filter, such as the observation model H_2 and/or the covariance R_2, particularly that of the measurement noise of the second sensor.

A cycle of the method may also include a determination of the measurements from at least one sensor. The cycle may be repeated in order to track the object over time.

Figure 8:
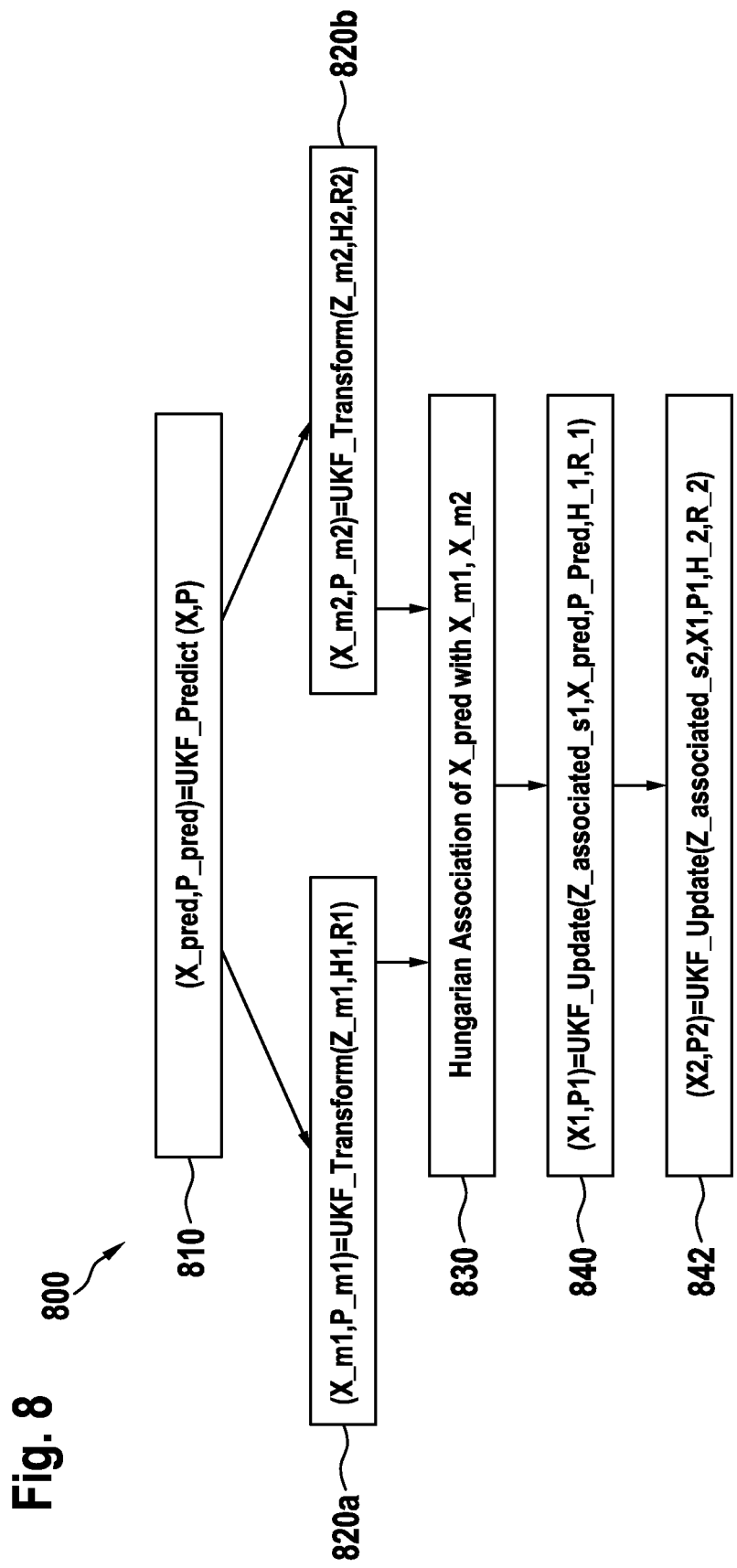
FIG. 8 illustrates a cycle of a method of tracking an object, according to an embodiment of the present disclosure.

FIG. 8 illustrates a cycle of a method 800 of tracking an object. The cycle may also include a determination of the measurements from at least one sensor. The method can include a determination 810 of the predicted state X_pred and covariance P_pred using an unscented Kalman filter. After the prediction 710, there can be a transformation(s) 820a, 820b of the predicted state X_pred from the global coordinate system to the local coordinates of the sensors. FIG. 8 can illustrate a scenario with exactly two sensors. More sensors are possible. The transformation(s) 820a, 820b can determine the predicted measurements X_m1, X_m2 of each sensor, and, optionally, predicted covariance(s) P_m1, P_m2. The transformations 820a, 820b can utilize the predicted measurement Z_m1, an observation model H1 and noise covariance R1 of the first sensor, and of the other sensors, such as the second sensor, Z_m2, H2, R2.

The predicted measurements X_m1 for the first sensor and other sensors, such as the second sensor X_m2, can be determined 830 for matching, e.g., associated using Hungarian bipartite association. The determination 830 of matching can be done using the measurements determined from at least one sensor, such as from two sensors, as shown in FIG. 8. The determination 830 of matching can determine a matching result, such as to determine the association between actual measurements and predicted measurements.

The state of the object can be updated 840, 842 in the local coordinate space, e.g., there can be a first update 840 to the state as expressed in the local space of the first sensor, and there can be a second update 842 to the state, such as an update expressed in the local space of the second sensor. There can be at least as many updates 840, 842 during one cycle of the tracking method 800 as there are sensors for which there are measurements, for that particular cycle. (The tracking method 800 can include more than one cycle).

The first update 840 can be based on at least one of: the relevant measurements determined by the matching 830 for the relevant sensor(s) (e.g., Z_associated, such as for the first sensor), the innovation matrix (such as S1 for the first sensor) relevant to the first sensor measurements and the prediction, the predicted state X_Pred, the predicted covariance P_Pred, the observation model relevant for the first sensor H_1, and the noise covariance of the first sensor R_1.

The second update 842 can be based on at least one of: the relevant measurements determined by the matching for the relevant sensor (e.g., Z_associated, such as for the second sensor), the innovation matrix relevant to the sensor measurements and the prediction (e.g., S2 for the second sensor), the previous update to the state (e.g., X1, for when there has already been an update from a previous sensor, in this case the first sensor), the predicted state, the predicted covariance (e.g., P1, for when there has already been an update from a previous sensor, in this case the first sensor), the observation model relevant for the sensor (e.g., H_2 for the second sensor), and the noise covariance of the sensor (e.g., R_2 for the second sensor).

The methods of tracking described herein can aid in reducing loss of tracking particularly when there are spurious and/or missing tracking signals and/or measurements. For example, when one sensor provides outlier data and/or the object leaves the field of view of the one sensor, the measurements from the other sensor(s) may continue to be adequate for accurate tracking. The matching determined herein may allow for determining and/or neglecting outlier measurements.

An example algorithm flow is provided, in which the lines of pseudocode are enumerated and parameters azi and ele refer to azimuthal angle and elevation angle respectively:

1. If (no_measurements)
2. (X,P)=UKFPredict (X,P)
3. Elseif (azi=present, ele=absent)
4. (Xpred,Ppred)=UKFPredict (X,P)
5. (X,P)=UKFUpdate1(Xpred, Ppred)
6. Elseif (azi=absent, ele=present)
7. (Xpred,Ppred)=UKFPredict (X,P)
8. (X,P)=UKFUpdate2(Xpred, Ppred)
9. Else
10. (Xpred,Ppred)=UKFPredict (X,P)
11. (X1,P1)=UKFUpdate1(Xpred, Ppred)
12. (X,P)=UKFUpdate2(X1, P1)
13. end In the methods of tracking described herein, as exemplified above, the sensor(s) can each provide azimuthal data and/or elevation data (or no data), e.g., for each cycle of the tracking method. As in the example pseudocode above, the method may possibly make no change to the state of the object, for example when there is no data (lines 1-2); the prediction can be based on an unscented Kalman filter, for example; the method can update the state in a way that depends on whether there is only azimuthal data (lines 3-5), only elevation data (lines 6-8), or both azimuthal and elevation data (lines 9-12).

FIG. 9 illustrates mathematical operations and definitions. The operations and/or definition of FIG. 9 can be used in the methods described herein. In the left column, there are matrices defined for an unscented Kalman filter, which can be used in the prediction of a state. The top matrix, P, of the left column can represent the initially predicted covariance. The middle matrix Q can be the process noise covariance, as initially predicted. F can be a state transition matrix, and/or the motion model used for the prediction.

The middle column of FIG. 9 illustrates operations pertaining to coordinate transformation, such as for a sensor that is 0.6 distance units from the global origin along a y direction and otherwise in alignment with the global coordinates (e.g., no rotation is necessary). A transformation matrix R is defined at the top of the middle column, for this scenario. The middle column illustrates that it is possible to convert from global to local coordinates, e.g., to convert to measurement space (which may be equivalent to converting to local coordinates), and to convert between Cartesian and polar coordinates (bottom of middle column of FIG. 9). Herein, coordinate and/or spatial transformations of the state of an object are particularly envisioned.

The right column of FIG. 9 illustrates operations pertaining to coordinate transformation, such as for a sensor that is 0.4 units from the global origin along an x direction, and also orientationally rotated 90° about the z axis from the global coordinates. The transformation matrix R is defined at the top of the right column, for this scenario. Otherwise, the third column is similar to that of the middle column at least in the sense that it is possible to convert from global to local coordinates, e.g., to convert to measurement space (which may be equivalent to converting to local coordinates), and to convert between Cartesian and polar coordinates.

Figure 10:
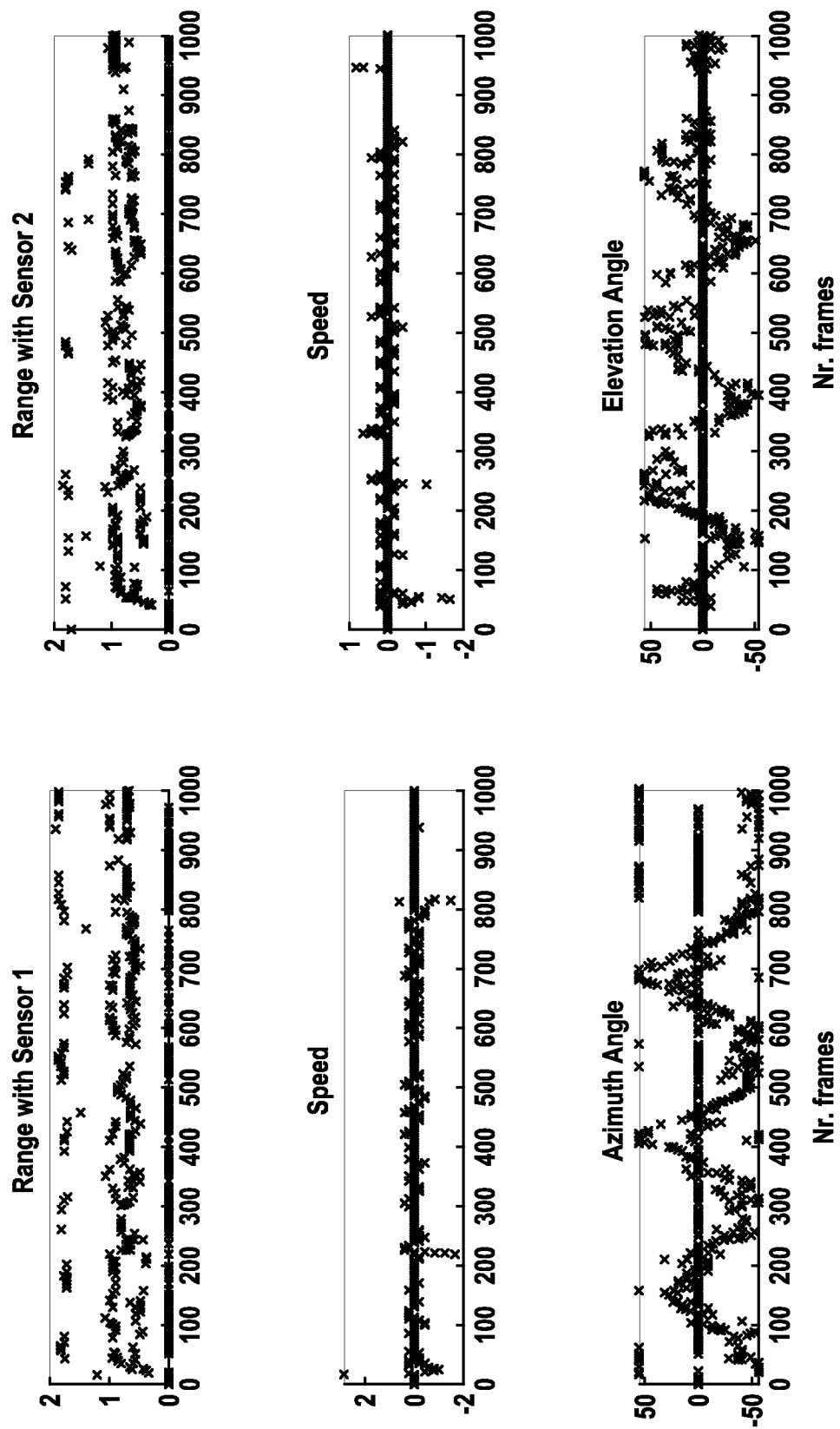
FIG. 10 illustrates data of an embodiment.
Figure 11:
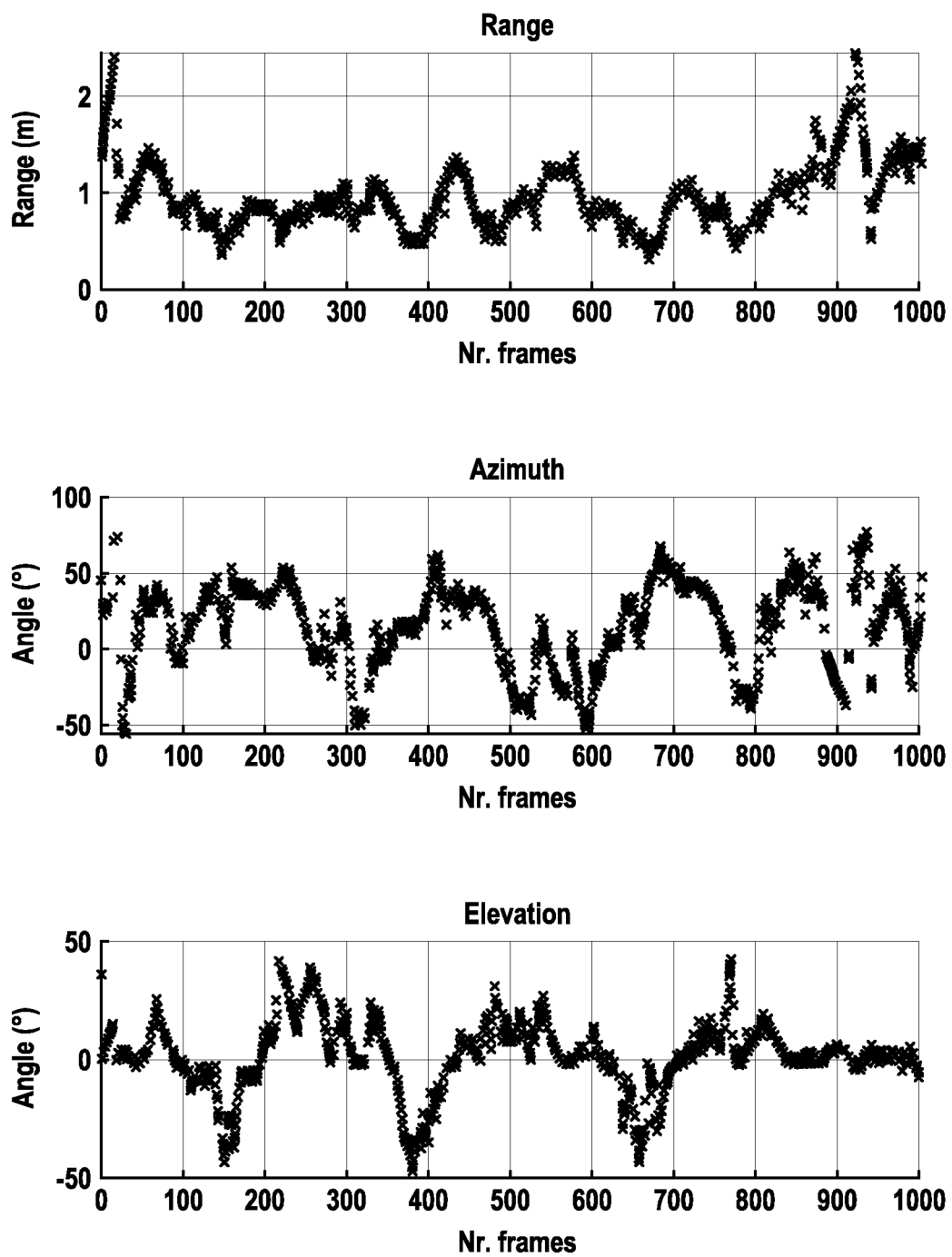
FIG. 11 illustrates tracker output of an embodiment.
Figure 12:
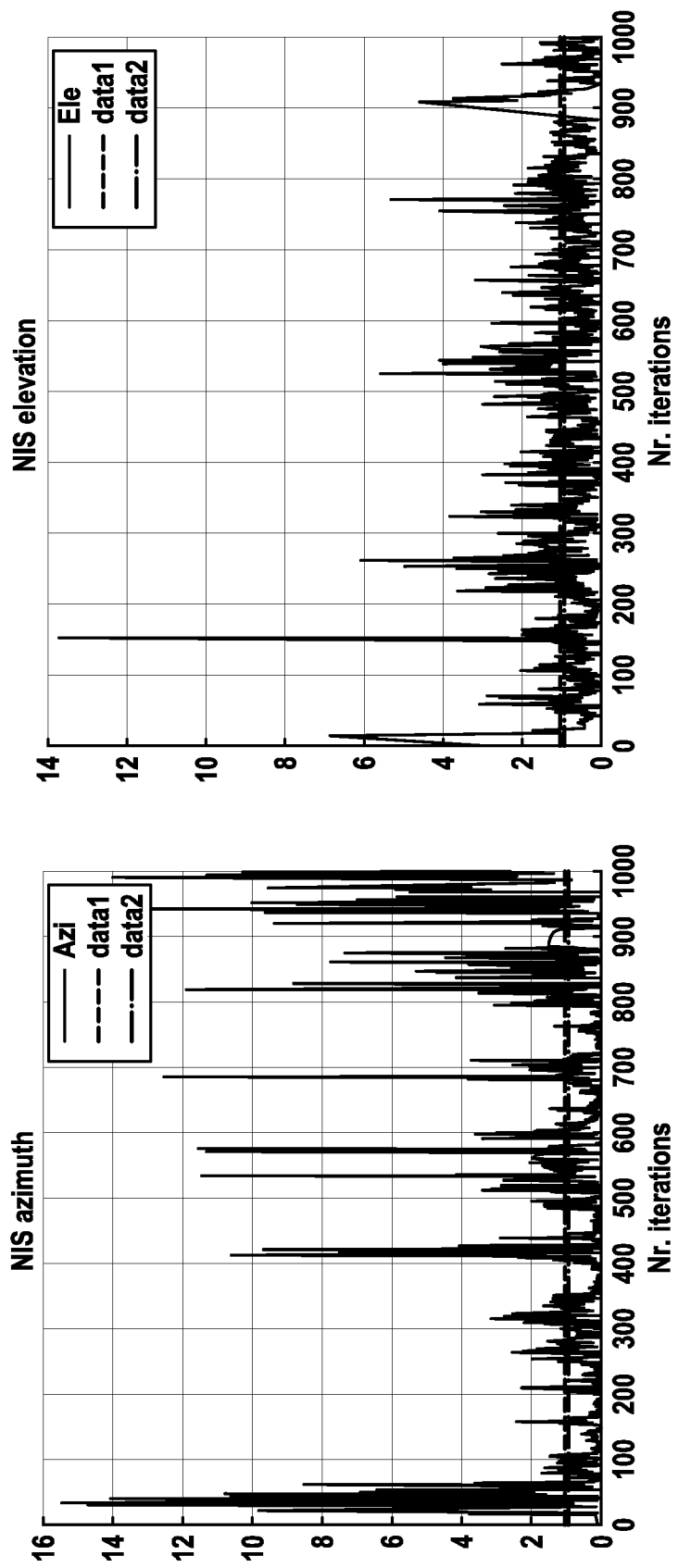
FIG. 12 illustrates a normalized innovation squared metric of an embodiment.

FIGS. 10-12 illustrates an example, including data collected by the sensors (FIG. 10), tracker output (FIG. 11) which may be regarded as the states predicted and/or determined by the method of tracking, and the normalized innovation squared for azimuth and elevation (FIG. 12). Frames of FIGS. 10-12 may be regarded as corresponding to successive cycles of the tracking method.

The example shown in FIGS. 10-12 may highlight some features of the methods described herein. The example is one for which it is challenging to track the object, in order to aid in the explanation of the methods described herein, and advantages thereof.

For the example illustrated in FIGS. 10-12, an object was rotated in a plane substantially parallel with the reference plane of the device, which has two sensors in the reference plane. The object was rotated at about 1 meter from the reference plane. The left column of FIG. 10 shows the data from a first sensor, and the right column that of a second sensor. The range and speed data from the sensors (FIG. 10) is more difficult to interpret than the angle data (FIG. 10). From the azimuthal data and the elevation data (FIG. 10), the periodic motion of the object can be more easily inferred.

Superimposed on each of the periodic signals of the azimuth data and elevation data is noise, dropped signals (zeros). Furthermore, each of the azimuthal and elevation measurements of the object also appears to be periodically out of range of the sensors, particularly for the second sensor's elevation data. Comparing the azimuthal and elevation data, it is inferred that the periodic motion of the object of this example is more often out of range of the second sensor than the first sensor (e.g., the crests of the elevation angle seem to be chopped off more than the troughs of the azimuth, which also appear to be chopped). It is also inferred from the data of FIG. 10 that there is loss of signal at approximately frame number 800.

FIG. 11 illustrates the tracker output. In comparison to the measurements of FIG. 10, there are fewer spurious data points for each of the range, azimuth, and elevation for the tracker output (FIG. 11) than the measurements (FIG. 10). For example, the state variable of range (as determined and/or cyclically updated by the tracking method) is on average approximately 1 meter and does not show the jumps that are seen in the range measurements of FIG. 10. The comparison of the tracker's determination range and the data from the sensor(s) may particularly highlight the capability of the tracking methods described herein, e.g., due to the comparatively smoother tracker output of range (FIG. 11) than raw measurement of range (FIG. 10).

The state variable of azimuth (as determined and/or cyclically updated by the tracking method) seen in FIG. 11 lacks the measurement drops (the zeros) seen in FIG. 10. The state variable of elevation (as determined and/or cyclically updated by the tracking method) seen in FIG. 11 lacks the measurement drops (the zeros) seen in FIG. 10. Also, the crests and troughs of the state variables azimuth and elevation (FIG. 11) do not appear as chopped as the sensor measurements of azimuth and elevation (FIG. 10).

FIG. 12 illustrates the normalized innovation squared (NIS) for azimuth and elevation. The NIS can be regarded as a test for biasedness, for example. The unscented Kalman filter has parameters and/or matrices that can be tweaked, tuned, and/or adjusted to optimize results. The NIS can be used to determine how to adjust the Kalman filter. The Kalman filter parameters may be adjusted after any frame and/or cycle of the method. According to one of several ways of interpreting the NIS metric as shown in FIG. 12, the NIS can (in some scenarios) sharply increase over a few frames when there is a relatively large increase in the difference in the predicted state and the measurement. For example, at approximately frame 400, the NIS of the azimuth shows a spike (left side of FIG. 12). This spike can be interpreted to correspond to the comparatively rapid change of angle seen in the azimuthal measurement (see FIG. 10) from the first sensor at frame 400.

A few spikes in NIS are also noted from approximately frame 500 to fame 600 of the NIS azimuth (FIG. 12). Comparing to frames 500-600 of the azimuth angle measurement (FIG. 10), this corresponds to where the trough of the generally sinusoidal measurement data is chopped (e.g., for being at the edge or beyond of the field of view of the first sensor). It can be appreciated that the elevation angle measurement (FIG. 10 lower right) is smoother than the azimuthal measurement (FIG. 10 lower left); this can account for how, in FIG. 12, the NIS elevation metric is smoother than the NIS azimuthal metric.

In view of the above example pertaining to FIGS. 10-12, particularly in combination with the description of the methods herein such as with reference to FIGS. 1-9, it is apparent that the methods described herein can aid in tracking an object in situations in which there are challenging circumstances such as signal drops from at least one sensor, spurious signals, and/or the object passing for a duration out of the field of view of a sensor.

Herein, sensors may be radar sensors and which may include at least one of a radar receiver and radar transmitter. The methods of tracking described herein may involve repeated cycles of the processes and/or steps described. Herein, the state of a tracked object may be repeatedly updated, such as in accordance with new measurements and other procedures and/or steps. For example, a sequence of updates to the state of the object may be regarded as tracking and/or part of a tracking process.

Herein, the term "global coordinate space" may be used interchangeably with "global coordinates." Herein a trailing "(s)" of a term, such as appears in "track(s)" is used to indicate at least one of the terms, such as "at least one track;" the trailing (s) may be regarded as indicating a possible plurality.

Herein, the term "fusion" can refer to a determination of a predicted state based on at least one of a previous state, a measurement (such as from a sensor, particularly a radar sensor); for example fusion can refer to determining, using an unscented Kalman filter, a predicted state based on a previous state and plurality of measurements.

Herein the term "Hungarian bipartite matching" may be used interchangeably with "Hungarian bipartite association." The tracking described herein may be done in three dimensional space.

Herein, a "node" may refer to, for example: a measurement; a plurality of measurements; a state; a component or substate of a state such as a position and/or velocity; and a track. A track may be a sequence of states of an object. A state may be a previous state, a determined state, a current state, or future state; for example a state may be updated by a process that includes predicting a predicted state based on the state (e.g., the current or previous state) and matching the state to measurements. Herein an "existing track" may be a type of track that includes at least one previous state, e.g., a state determined at a time previous to a plurality of measurements being used as nodes in a Hungarian bipartite matching process, and may optionally include a predicted state.

Herein a velocity can be an angular velocity or linear velocity. Herein "transform" and "transformation" can be used interchangeably, particularly to refer to a coordinate transformation.

Herein, the term "measurement" may refer to, for example, data directly obtained by a sensor, data transmitted from a sensor (such as to a processor), data used by a processor; for example, a measurement may be at least one of a range, azimuthal angle, elevation, angular velocity, radial velocity, linear velocity, velocity component, position, position component. A measurement may be determined based on acquired data. In an example, a measurement of position may be determined from a range and angles.

Herein, when an element is "connected" or "coupled" to another element, the elements may be directly connected or coupled via one or more intervening elements. Herein, when two elements A and B are combined using an "or", all possible combinations are disclosed unless otherwise described. "A and B" can mean only A, only B as well as A and B. The same applies, mutatis mutandis, for combinations of more than two elements.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. A method of tracking an object, the method comprising:
predicting a predicted state, in a global coordinate space, of the object based on a state of the object;
determining in local coordinates the predicted state;
determining a plurality of measurements of the object, in the local coordinates, with a first radar sensor and/or a second radar sensor;
determining a matching of the predicted state and the plurality of measurements, in the local coordinates, to generate a matching result; and
updating the state of the object based on the matching result, wherein the first radar sensor and the second radar sensor are arranged along perpendicular lines which intersect at an origin of the global coordinate space.

2. The method of claim 1, wherein determining the matching comprises:
determining a first matching result of the predicted state and a plurality of first measurements of the first radar sensor; and
determining a second matching result of the predicted state and a plurality of second measurements of the second radar sensor.

3. The method of claim 1, wherein determining in the local coordinates the predicted state comprises:
coordinate-transforming the predicted state of the object into a first local space of the first radar sensor; and
coordinate-transforming the predicted state of the object into a second local space of the second radar sensor.

4. The method of claim 3, wherein:
the first local space originates at the first radar sensor;
the second local space originates at the second radar sensor;
the second local space is rotated at an angle from the global coordinate space along a z-axis which extends away from an x-y plane which includes the first radar sensor, the second radar sensor and the origin of the global coordinate space, the z-axis being orthogonal to the x-y plane; and
an orientation of the second radar sensor is rotated at the angle along the z-axis from alignment with the global coordinate space.

5. The method of claim 4, wherein determining the matching comprises:
determining a first matching of the predicted state and a first plurality of first measurements of the first radar sensor; and
determining a second matching of the predicted state and a second plurality of second measurements of the second radar sensor.

6. The method of claim 5, wherein the updating comprises:
performing a first update to the state between determining the first matching and determining the second matching; and
performing a second update to the state after determining the second matching.

7. The method of claim 5, wherein:
coordinate-transforming the predicted state into the first and second local spaces comprises coordinate-transforming the predicted state into the first and second local spaces before determining the matching and after determining in global coordinates the predicted state;
determining the matching is based on the first plurality of first measurements and the second plurality of second measurements; and
updating the state of the object comprises updating the state of the object after determining the matching.

8. The method of claim 1, wherein the first radar sensor and the second radar sensor are separated by a first distance, the first distance being between 3 cm and 30 cm, and wherein the origin of the global coordinate space is at a center of a device.

9. The method of claim 8, wherein the first distance is between 5 cm and 10 cm.

10. The method of claim 1, wherein the first radar sensor is at a first edge of a device and the second radar sensor is at a second edge of the device.

11. The method of claim 1, wherein the state comprises a position and velocity of the object.

12. The method of claim 1, wherein predicting the predicted state comprises predicting the predicted state based on an unscented Kalman filter.

13. The method of claim 1, wherein determining the matching comprises determining the matching based on a Hungarian bipartite matching which determines the matching of the plurality of measurements and an existing track which includes at least one state determined at a time preceding the determining of the plurality of measurements.

14. The method of claim 1, wherein determining the plurality of measurements triggers the determining the matching, and wherein updating the state of the object follows the determining the matching.

15. A non-transitory computer readable medium with instructions stored thereon, wherein the instructions, when executed by a processor, enable the processor to perform the method of claim 1.

16. A device comprising:
a plurality of sensors arranged along perpendicular lines which intersect at an origin of a global coordinate space, the plurality of sensors comprising a first radar sensor and a second radar sensor; and
a processor configured to:
predict a predicted state, in the global coordinate space, of an object based on a state of the object,
determine in local coordinates the predicted state,
determine a plurality of measurements of the object, in the local coordinates, with the first radar sensor and/or the second radar sensor,
determine a matching of the predicted state and the plurality of measurements, in the local coordinates, to generate a matching result, and
update the state of the object based on the matching result.

17. The device of claim 16, wherein the processor is configured to determine in the local coordinates the predicted state by coordinate-transforming the predicted state of the object into a first local space of the first radar sensor, and coordinate-transforming the predicted state of the object into a second local space of the second radar sensor, wherein the first local space originates at the first radar sensor, wherein the second local space originates at the second radar sensor, wherein the second local space is rotated at an angle from the global coordinate space along a z-axis which extends away from an x-y plane which includes the first radar sensor, the second radar sensor and the origin of the global coordinate space, the z-axis being orthogonal to the x-y plane, and wherein an orientation of the second radar sensor is rotated at the angle along the z-axis from alignment with the global coordinate space.

18. The device of claim 17, wherein the processor is configured to determine the matching by determining a first matching of the predicted state and a first plurality of first measurements of the first radar sensor, and determining a second matching of the predicted state and a second plurality of second measurements of the second radar sensor, and wherein the processor is configured to update the state of the object by performing a first update to the state between determining the first matching and determining the second matching, and performing a second update to the state after determining the second matching.

19. The device of claim 16, wherein the first radar sensor is disposed at a first edge of the device and the second radar sensor is at a second edge of the device.

20. A device comprising:

A first millimeter-wave radar sensor and a second millimeter-wave radar sensor respectively arranged along perpendicular lines which intersect at an origin of a global coordinate space, wherein the first millimeter-wave radar sensor is disposed at a first edge of the device and the second millimeter-wave radar sensor is at a second edge of the device, and wherein the origin of the global coordinate space is at a center of the device; and a processor configured to:
  predict a predicted state, in the global coordinate space, of an object based on a state of the object,
  determine in local coordinates the predicted state,
  determine a plurality of measurements of the object, in the local coordinates, with the first millimeter-wave radar sensor and/or the second millimeter-wave radar sensor,
  determine a matching of the predicted state and the plurality of measurements, in the local coordinates, to generate a matching result, and
  update the state of the object based on the matching result.

* * * * *